US011041525B1

(12) United States Patent
Mueller et al.

(10) Patent No.: US 11,041,525 B1
(45) Date of Patent: Jun. 22, 2021

(54) MAST BEARING RACE

(71) Applicant: Bell Textron Inc., Fort Worth, TX (US)

(72) Inventors: Douglas Robert Mueller, Coppell, TX (US); Gregory Alan Spruce, Grand Prairie, TX (US); Alan Wayne Falls, Arlington, TX (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 16/750,411

(22) Filed: Jan. 23, 2020

(51) Int. Cl.
*F16C 19/26* (2006.01)
*B64C 27/32* (2006.01)
*F16C 35/073* (2006.01)
*F16C 33/58* (2006.01)
*F16C 35/063* (2006.01)

(52) U.S. Cl.
CPC .............. *F16C 19/26* (2013.01); *B64C 27/32* (2013.01); *F16C 33/583* (2013.01); *F16C 35/063* (2013.01); *F16C 35/073* (2013.01); *F16C 2226/16* (2013.01); *F16C 2226/60* (2013.01); *F16C 2240/30* (2013.01); *F16C 2326/43* (2013.01)

(58) Field of Classification Search
CPC .......... F16C 19/06; F16C 19/26; F16C 35/06; F16C 35/063; F16C 35/077; F16C 35/073; F16C 35/12; F16C 33/583; F16C 2240/30; F16C 2226/12; F16C 2226/60; F16C 2326/43; F16C 2226/16; B64C 27/32; B64C 27/12
USPC ................ 384/538, 540, 548, 585, 569, 906
See application file for complete search history.

(56) References Cited

U.S. PATENT DOCUMENTS

| | | | | |
|---|---|---|---|---|
| 4,240,677 A * | 12/1980 | Payne | ................... | F16C 35/063 384/252 |
| 6,893,160 B2 * | 5/2005 | Casey | ................... | F16C 35/073 384/538 |
| 7,305,767 B2 * | 12/2007 | Nisley | ................... | F16C 35/073 29/894.361 |
| 8,302,981 B1 * | 11/2012 | Ma | ......................... | B62K 21/06 280/279 |
| 2011/0136578 A1 * | 6/2011 | Kawamura | ......... | F16C 33/6633 464/15 |
| 2018/0043960 A1 * | 2/2018 | Coaplen | ................. | B62K 21/08 |
| 2018/0087670 A1 * | 3/2018 | Poster | .................. | F16J 15/3224 |

(Continued)

FOREIGN PATENT DOCUMENTS

| | | | | |
|---|---|---|---|---|
| CN | 108238238 A * | 7/2018 | ............. | B64C 25/44 |
| WO | WO-2007115465 A1 * | 10/2007 | ............. | B64C 27/16 |
| WO | WO-2014010634 A1 * | 1/2014 | ............... | B64C 5/12 |

*Primary Examiner* — Marcus Charles
(74) *Attorney, Agent, or Firm* — Shackelford, Bowen, McKinley & Norton, LLP

(57) ABSTRACT

A system for securing a bearing to a shaft includes a shaft having a raised portion extending radially outward from the shaft. The raised portion includes a first angled face on a first side of the raised portion and a second angled face on a second side of the raised portion. The bearing includes an outer race comprising a bearing surface on an inner face of the outer race, an inner race comprising a bearing surface on an outer face of the inner race and a third angled face on an inner face of the inner race that is configured to mate with the first angled face, and a plurality of rollers disposed between the inner and outer races.

18 Claims, 4 Drawing Sheets

(56) References Cited

U.S. PATENT DOCUMENTS

2018/0245630 A1* 8/2018 Takaoka ................ F16C 35/067
2018/0334923 A1* 11/2018 Leeder ................. F16C 33/581

* cited by examiner

MAST BEARING RACE

TECHNICAL FIELD

The present disclosure relates generally to bearings for use with a shaft and more particularly, but not by way of limitation, to bearings for use with a mast of a rotor aircraft.

BACKGROUND

This section provides background information to facilitate a better understanding of the various aspects of the disclosure. It should be understood that the statements in this section of this document are to be read in this light, and not as admissions of prior art.

Some legacy masts are made from steel that is able to be surface hardened. The surface hardened steel can be used an integral bearing race. However, these steels are also prone to corrosion. For future applications, corrosion-resistant steel has been selected, but corrosion-resistant steel cannot be suitably surface hardened to function as an integral bearing race.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An illustrative bearing includes an outer race comprising a bearing surface on an inner face of the outer race, an inner race comprising a bearing surface on an outer face of the inner race and a first angled face on an inner face of the inner race, and a plurality of rollers disposed between the inner and outer races, each roller of the plurality of rollers being in contact with the bearing surfaces of the outer and inner races.

An illustrative system for securing a bearing to a shaft includes a shaft having a raised portion extending radially outward from the shaft. The raised portion includes a first angled face on a first side of the raised portion and a second angled face on a second side of the raised portion. The bearing includes an outer race comprising a bearing surface on an inner face of the outer race, an inner race comprising a bearing surface on an outer face of the inner race and a third angled face on an inner face of the inner race that is configured to mate with the first angled face, and a plurality of rollers disposed between the inner and outer races.

An illustrative method of securing a bearing onto a shaft includes sliding the bearing onto a first end of the shaft until an inner race of the bearing meets a raised portion of the shaft, forcing the bearing onto the raised portion to form a press fit between the bearing and the raised portion, sliding a nut onto a second of the shaft until the nut abuts the inner race of the bearing, and rotating the nut to engage threads of the nut with threads of the inner race.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
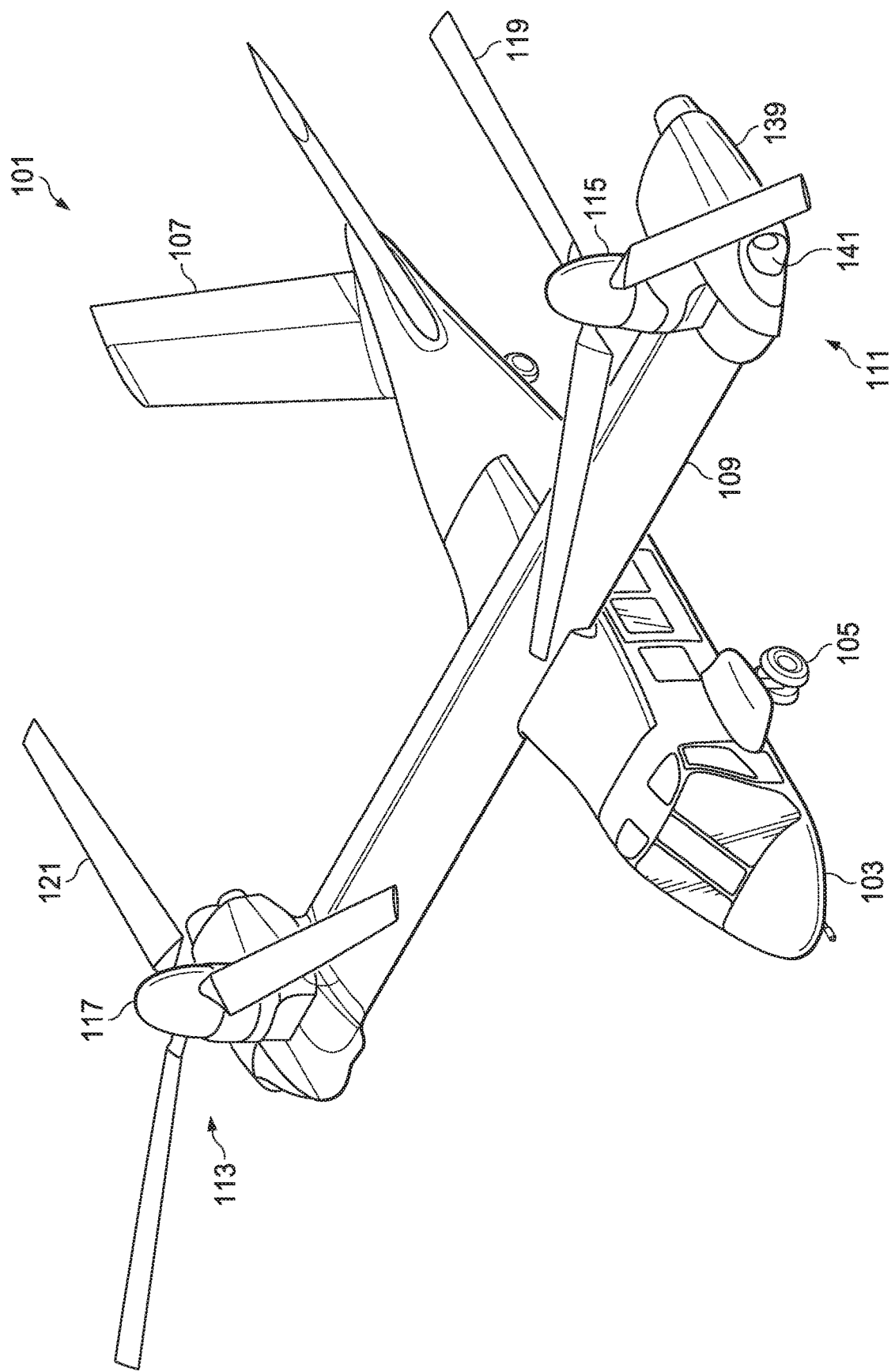
FIG. 1 is a perspective view of a tiltrotor aircraft in helicopter mode, according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
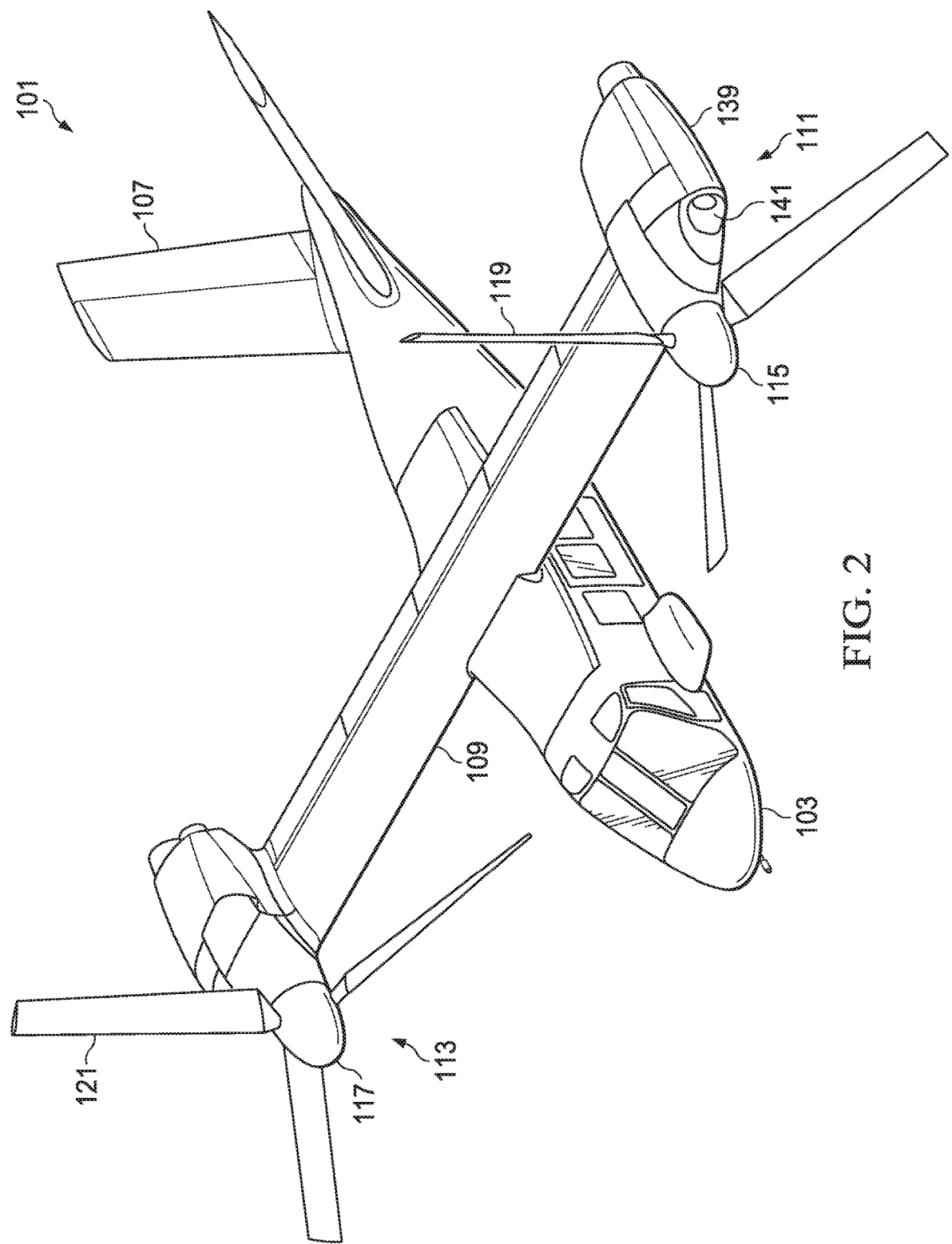
FIG. 2 is a perspective view of a tiltrotor aircraft in airplane mode, according to aspects of the disclosure.

FIGS. 1 and 2 illustrate a tiltrotor aircraft 101, according to aspects of the disclosure. Tiltrotor aircraft 101 includes a fuselage 103, landing gear 105, a tail member 107, a wing 109, a drive system 111, and a drive system 113. Each drive system 111, 113 includes a fixed engine 139 and a proprotor 115, 117, respectively. Each proprotor 115, 117 has a plurality of rotor blades 119, 121, respectively, associated therewith. Engine 139 includes an inlet 141. The position of proprotors 115, 117, as well as the pitch of rotor blades 119, 121, can be selectively controlled in order to selectively control direction, thrust, and lift of tiltrotor aircraft 101.

FIG. 1 illustrates tiltrotor aircraft 101 in helicopter mode in which proprotors 115, 117 are positioned substantially vertical to provide a lifting thrust. FIG. 2 illustrates tiltrotor aircraft 101 in an airplane mode in which proprotors 115, 117 are positioned substantially horizontal to provide a forward thrust in which a lifting force is supplied by wing 109. It should be appreciated that tiltrotor aircraft 101 can be operated such that proprotors 115, 117 are selectively positioned between airplane mode and helicopter mode, which can be referred to as a conversion mode.

Drive system 113 is substantially symmetric to drive system 111; therefore, for sake of efficiency, certain features will be disclosed only with regard to drive system 111. However, one of ordinary skill in the art would fully appreciate an understanding of drive system 113 based upon the disclosure herein of drive system 111. Further, drive systems 111, 113 are illustrated in the context of tiltrotor aircraft 101; however, drive systems 111, 113 can be implemented on other tiltrotor aircraft. For example, an alternative embodiment may include a quad tiltrotor that has an additional wing member aft of wing 109; the additional wing member can have additional drive systems similar to drive systems 111, 113. In another embodiment, drive systems 111, 113 can be used with an unmanned version of tiltrotor aircraft 101. Further, drive systems 111, 113 can be integrated into a variety of tiltrotor aircraft configurations. Additionally, other drive systems are contemplated. For example, one example is a gearbox arrangement to provide torque to a rotor system of a helicopter.

Referring to tiltrotor aircraft in general, each drive system 111, 113 includes a mast driven by a power source (e.g., engine 139). Each drive system 111, 113 also includes a yoke connected to the mast, with rotor blades indirectly connected to the yoke via bearings. The bearings may be, for example, elastomeric bearings constructed from a rubber-type material that absorbs vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub or a teetering rotor. Coning generally refers to an upward flexing of a rotor blade due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch.

The power source, mast, and yoke are components for transmitting torque. The power source may include a variety of components including an engine, a transmission, and differentials. In operation, each mast receives torque from the power source to rotate the yoke. Rotation of the yoke causes the rotor blades to rotate to generate thrust. Each mast includes one or more mast bearings that stabilize and secure the masts relative to the aircraft. Bearings are typically positioned between a rotating component (e.g., the mast) and a stationary component (e.g., a support structure within the nacelle). This disclosure focuses on roller-type bearings, but a person of skill in the art will recognize that aspects of this disclosure can apply to other types of bearings as well. Roller-type bearings include an outer race that is secured to the stationary component and an inner race that is secured to the mast, which rotates relative to the stationary component. A plurality of rollers or balls are positioned between the inner and outer races to allow the inner race to rotate relative to the outer race. Some bearings further include a separator or cage that spaces the rollers or balls evenly within the bearing. Some conventional mast bearing designs use an outer surface of the mast as the inner race. These conventional masts are typically made from steels that can be surface treated such that the outer surface of the mast can be used as the inner race of the mast bearing. In these designs, the rollers or balls ride upon the outer surface of the mast and the outer race.

While using the outer surface of the mast as the inner bearing race can be desirable as it simplifies the design of the mast, situations can arise where the mast suffers from corrosive wear due to the use of hardened steel. To avoid the issue of corrosive wear, a material that is less prone to corrosive wear (e.g., PH 13-8Mo or Titanium) may be used instead of hardened steel. Using these alternative materials does address the issue of corrosive wear; however, these alternative materials are incapable of being surface hardened to the same extent as the steel used in conventional masts, and thus are insufficient for use as the inner race of the mast bearing. The instant disclosure is directed to a mast bearing that includes an inner race that is secured to the mast.

Figure 3:
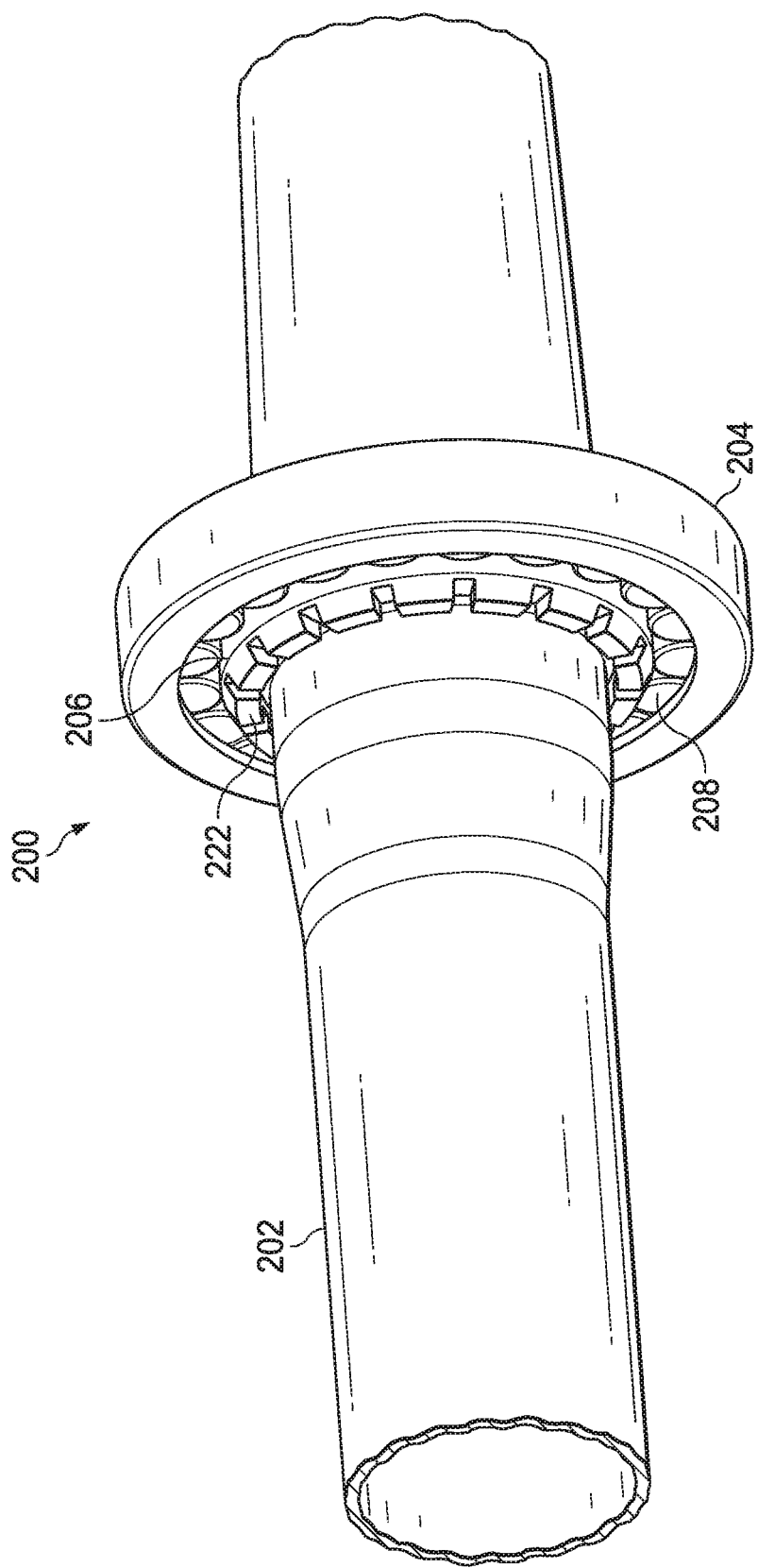
FIG. 3 is a perspective view of a mast bearing fitted to a mast of a tiltrotor aircraft according to aspects of the disclosure.

FIG. 3 is a perspective view of a bearing 200 fitted to a shaft or mast 202 of a tiltrotor aircraft (e.g., tiltrotor aircraft 101) according to aspects of the disclosure. Bearing 200 provides a way to secure a bearing to a mast while at the same time minimizing high stress points that can result from the inclusion of features such as threads, shoulders, sharp radii, and the like. In other words, shaft or mast 202 of the instant disclosure does not include threads, shoulders (e.g. collar shaped portions), sharp radii, and the like to secure bearing 200 thereto.

Figure 4:
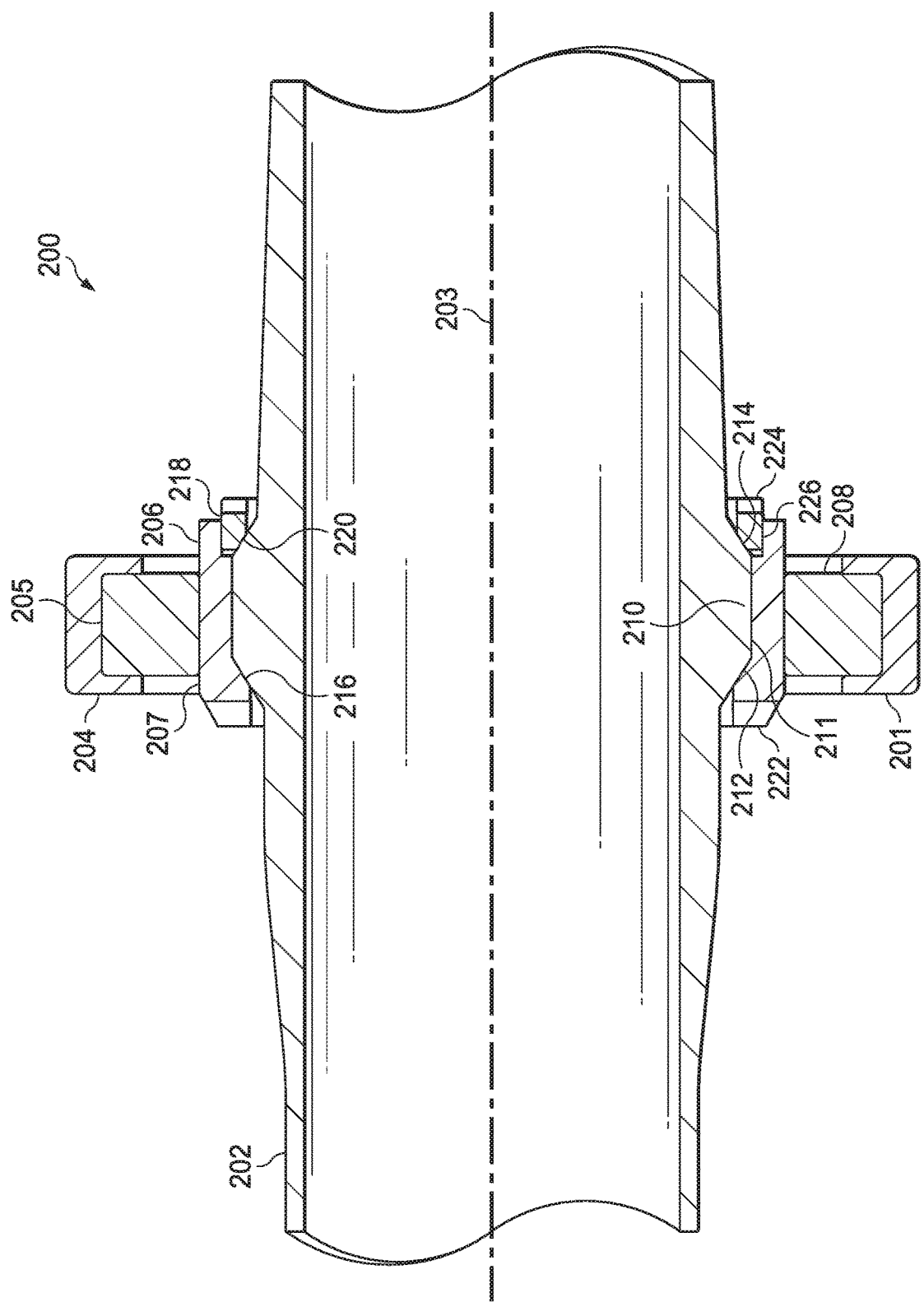
FIG. 4 is sectioned view of a mast according to aspects of the disclosure.

Bearing 200 includes an outer race 204, an inner race 206, and a plurality of rollers 208. FIG. 4 is a sectioned view of bearing 200 fitted to mast 202 according to aspects of the disclosure. The plurality of rollers 208 ride on a bearing surface 207 of inner race 206 and a bearing surface 205 of outer race 204. As illustrated in FIGS. 3 and 4, outer race 204 includes side walls 201 that help retain the plurality of rollers 208. In other aspects, side walls 201 may be incorporated into inner race 206 instead.

Mast 202 includes a raised portion 210 that has a greater diameter than the portions of mast 202 that are on either side of raised portion 210. Raised portion 210 includes angled faces 212, 214 that are located on opposite sides of a face 211. Raised portion 210 serves as a locating feature for bearing 200. Raised portion 210 is positioned along the length of mast 202 so that bearing 200 is located at the desired position. In some aspects, faces 212, 214 of raised portion 210 are angled between approximately 40°-50° relative to a central axis 203 of mast 202. Inner race 206 includes a face 216 that is angled to complement the angle of face 212 so that faces 212, 216 mate together.

Bearing 200 is secured to mast 202 by sliding bearing 200 onto mast 202 so that face 216 meets up with face 212. Inner race 206 has an inner diameter that is smaller than the diameter of mast 202 at face 211 and inner race 206 is press fit onto raised portion 210. A nut 218 is then placed onto the opposite end of mast 202 and slid into place against inner race 206. Nut 218 includes threads on its outer surface that engage corresponding threads on an inner surface 226 of inner race 206. As illustrated in FIG. 4, inner surface 226 is recessed slightly from the inner diameter of inner race 206. Recessing inner surface 226 can allow for a more compact arrangement. As space is often limited around mast 202, a more compact arrangement is often preferable. In other aspects, inner surface 226 may be flush with the inner diameter of inner race 206. Nut 218 also includes a face 220 that is angled to complement the angle of face 214 so that faces 214, 220 mate together. Nut 218 is tightened so that a clamping force is exerted by faces 216, 220 upon raised portion 210 to lock bearing 200 in place on mast 202. In an alternative aspect, inner race 206 has an inner diameter that is slightly larger than the diameter of mast 202 at face 211 and inner bearing 206 is secured to mast 202 via the clamping force created by securing nut 218 to inner race 206.

As illustrated in FIG. 4, the angle of faces 212, 214 are the same, though oppositely oriented. In other aspects, faces 212, 214 may be oriented at different angles. For example, the angle of face 214 may be increased to improve the leverage between nut 218 and mast 202.

As illustrated in FIGS. 3 and 4, inner race 206 includes castellations 222 on an axial face of inner race 206 and nut 218 includes castellations 224 on an axial face of nut 218. Castellations 222, 224 aid in the securing of nut 218 to inner race 206 by improving grip between a tool (e.g., a wrench or socket) and nut 218 and inner race 206. In other aspects, either or both of castellations 222, 224 may be replaced with flat surfaces for gripping by a tool (e.g., like a standard nut or bolt head).

Those having skill in the art will recognize that the above disclosure applies to the mating of a bearing to any shaft, and not just aircraft masts. For example, the mast bearing disclosed herein could be implemented in wind turbines, boat propellers, drive shafts, and the like.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A mast bearing race, comprising:
   a rotor aircraft mast having a central axis with a raised portion, the raised portion comprising an outer surface generally parallel to the central axis and a first side and a second side on opposite sides of the raised portion;
   an outer race comprising a bearing surface on an inner face of the outer race;
   an inner race comprising a bearing surface on an outer face of the inner race and a first angled face on an inner face of the inner race, the inner race positioned on the raised portion with the first angled face abutting the first side;
   a nut having a second angled face abutting the second side and an outer threaded portion threadedly connected to the inner face of the of the inner race; and
   a plurality of rollers disposed between the inner and outer races, each roller of the plurality of rollers being in contact with the bearing surfaces of the outer and inner races.

2. The mast bearing race of claim 1, wherein the first angled face of the inner race and the second angled face of the nut are angled between 40°-50° relative to the central axis.

3. The mast bearing race of claim 1, wherein the inner race comprises a plurality of castellations on an axial face of the inner race.

4. The mast bearing race of claim 1, wherein the nut comprises a plurality of castellations on an axial face of the nut.

5. The mast bearing race of claim 1, wherein the outer race includes side walls configured to retain the plurality of rollers between the inner and outer races.

6. A bearing system comprising:
   a shaft comprising a raised portion extending radially outward, the raised portion comprising a first angled face on a first side of the raised portion and a second angled face on a second side of the raised portion;
   a bearing comprising:
   an outer race comprising a bearing surface on an inner face of the outer race;
   an inner race comprising a bearing surface on an outer face of the inner race and a third angled face on an inner face of the inner race that is configured to mate with the first angled face; and
   a plurality of rollers disposed between the inner and outer races, each roller of the plurality of rollers being in contact with the bearing surfaces of the outer and inner races.

7. The bearing system of claim 6, wherein a diameter of the inner race is smaller than an outer diameter of the raised portion.

8. The bearing system of claim 6, comprising:
   a nut comprising a fourth angled face on an inner surface of the nut and a threaded portion on an outer surface of the nut;
   wherein the inner face of the inner race comprises a threaded portion; and
   wherein the threaded portion of the nut is configured to engage the threaded portion of the inner race.

9. The bearing system of claim 8, wherein the third angled face and the fourth angled face are angled between 40°-50° relative to a central axis passing through the shaft.

10. The bearing system of claim 8, wherein the nut comprises a plurality of castellations on an axial face of the nut.

11. The bearing system of claim 6, wherein the inner race comprises a plurality of castellations on an axial face of the inner race.

12. The bearing system of claim 6, wherein the outer race includes side walls that retain the plurality of rollers between the inner and outer races.

13. The bearing system of claim 6, wherein the shaft is a mast of a rotor aircraft.

14. A method of securing a bearing onto a shaft, the method comprising:

sliding the bearing onto a first end of the shaft until an inner race of the bearing meets a raised portion of the shaft;

forcing the bearing onto the raised portion to form a press fit between the bearing and the raised portion, wherein an angled face on an inner face of the inner race contacts a first angled face of the raised portion;

sliding a nut onto a second end of the shaft until the nut abuts the inner race of the bearing; and rotating the nut to engage threads of the nut with threads of the inner race and to secure the bearing to the shaft, when the bearing is secured to the saft an angled face on an inner face of the inner race contacts a first angled face of the raised portion and an angled face on an inner face of the nut contacts a second angled face of the raised portion.

15. The method of claim 14, wherein the rotating the nut to engage the threads of the nut with the threads of the inner race causes the angled face of the inner race and the angled face of the nut to generate a clamping force between angled faces of the inner race and the nut that locks the bearing onto the shaft.

16. The method of claim 14, wherein the inner race comprises a plurality of castellations on an axial face of the inner race.

17. The method of claim 14, wherein the nut comprises a plurality of castellations on an axial face of the nut.

18. The method of claim 14, wherein the shaft is a mast of a rotor aircraft.

\* \* \* \* \*